Oct. 30, 1956     B. HOWARD     2,769,029
TELEGRAPH PRINTER Filed May 27, 1954     9 Sheets-Sheet 1

FIG. 1.

INVENTOR
BERNARD HOWARD
BY *James and Franklin*
ATTORNEYS

Oct. 30, 1956   B. HOWARD   2,769,029
TELEGRAPH PRINTER
Filed May 27, 1954   9 Sheets-Sheet 2

INVENTOR
BERNARD HOWARD
BY
James and Franklin
ATTORNEYS

Oct. 30, 1956     B. HOWARD     2,769,029
TELEGRAPH PRINTER

Filed May 27, 1954                    9 Sheets-Sheet 3

INVENTOR
BERNARD HOWARD
BY
ATTORNEYS

Oct. 30, 1956  B. HOWARD  2,769,029
TELEGRAPH PRINTER
Filed May 27, 1954  9 Sheets-Sheet 4

INVENTOR
BERNARD HOWARD
BY James and Franklin
ATTORNEYS

Oct. 30, 1956   B. HOWARD   2,769,029
TELEGRAPH PRINTER
Filed May 27, 1954   9 Sheets-Sheet 5

INVENTOR
BERNARD HOWARD
BY James and Franklin
ATTORNEYS

INVENTOR
BERNARD HOWARD
BY James and Franklin
ATTORNEYS

Oct. 30, 1956     B. HOWARD     2,769,029
TELEGRAPH PRINTER Filed May 27, 1954     9 Sheets-Sheet 7

INVENTOR
BERNARD HOWARD
BY
James and Franklin
ATTORNEYS

Oct. 30, 1956  B. HOWARD  2,769,029
TELEGRAPH PRINTER
Filed May 27, 1954  9 Sheets-Sheet 8

INVENTOR
BERNARD HOWARD
BY
James and Franklin
ATTORNEYS

United States Patent Office 2,769,029
Patented Oct. 30, 1956

2,769,029

TELEGRAPH PRINTER

Bernard Howard, Ramsey, N. J., assignor, by mesne assignments, to Teleprinter Corporation, Hackensack, N. J., a corporation of New Jersey Application May 27, 1954, Serial No. 432,877

26 Claims. (Cl. 178—35)

This invention relates to communications apparatus, and more particularly to printers which operate in response to coded or telegraph signals.

In my copending application Serial No. 339,119, filed February 26, 1953, now U. S. Patent No. 2,727,944 dated December 20, 1955, I have disclosed a telegraph printer having advantages over conventional printers, and utilizing a flexible strand or cable acted on by multiple pulleys, each of which may be moved to either of two positions, with the motion of a second pulley double that of a first, and so on, thereby providing different positions of the cable and consequent selection of type. This selection could be longitudinal or rotary, but preferably is both, thereby using a type cylinder carrying a large number of characters without requiring excessive motion in one direction. The pulleys there were moved by solenoids, which in turn were energized through local electrical circuits controlled by perforations in a five-level perforated tape. The incoming telegraphic signal was used to first perforate the tape, which then operated the printer.

The general object of the present invention is to improve telegraph printers of the type disclosed in my aforesaid copending application. One more specific but primary object of the present invention is to provide a telegraph printer which will operate in direct response to the code signals as received, and without requiring the preliminary preparation of a perforated tape.

Another primary object of the present invention centers about the means to move the pulleys. Instead of relying on solenoids, the pulleys here are moved under motor drive. A single motor may be employed to drive a cam shaft which carries cams for all of the pulleys, and also for certain special functions such as carriage return, paper feed from line to line, and shift between letters and figures. Moreover, the same motor may be employed to drive a sequence shaft which distributes the effect of the signals to the different pulleys, so that the printer may be operated without a perforated tape.

To accomplish the foregoing general objects, and other more specific objects which will hereinafter appear, my invention resides in the telegraph printer elements, and their relation one to another as are hereinafter more particularly described in the following specification. The specification is accompanied by drawings, in which.

Figure 1:
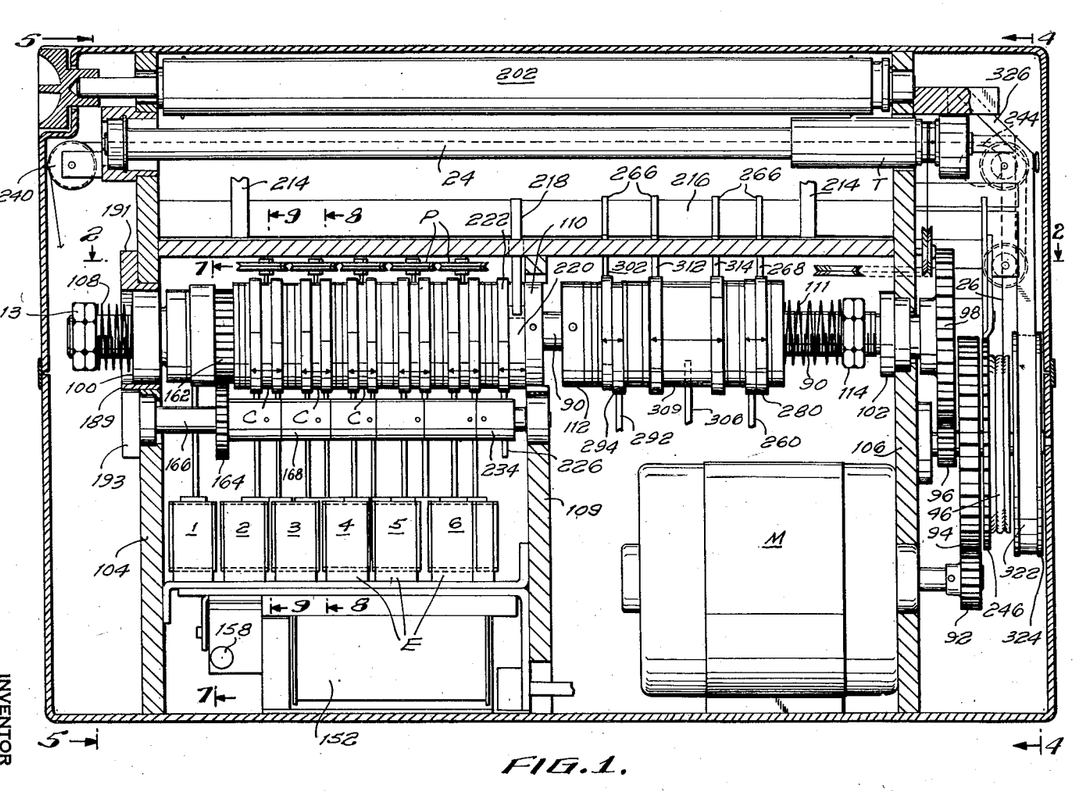
Fig. 1 is a front elevation of the interior of a telegraph printer embodying features of my invention.

Referring to the drawings, and more particularly to Fig. 1, the telegraph printer comprises a type body T having a plurality of characters to be printed, and one or more flexible strands or cables (in this case two) effectively connected to the type body for moving the same in order to select the particular character to be printed. There are a plurality of pulleys P, better shown in Fig. 2, about which the cable is trained in series, and a motor M (Fig. 1) for driving any of a series of cams, generally designated C, to either of two positions. There are also electrical or magnetic means, generally designated E, associated with the cams, to make the motor M operative to move one cam or another from its "in" position to its "out" position, or vice versa. The pulleys are carried by cam follower levers which are thus moved between either of two positions, in a direction to effectively shorten or lengthen the cable. The effective cable change produced by one of said cams and pulleys is double that produced by another, and so on, thus making it possible to select any desired position of the type body T. The apparatus also includes a rather simple electrical circuit shown in Fig. 22 for energizing the electromagnets E in appropriate combinations to select the desired character to be printed.

Figures 8, 9, 10:
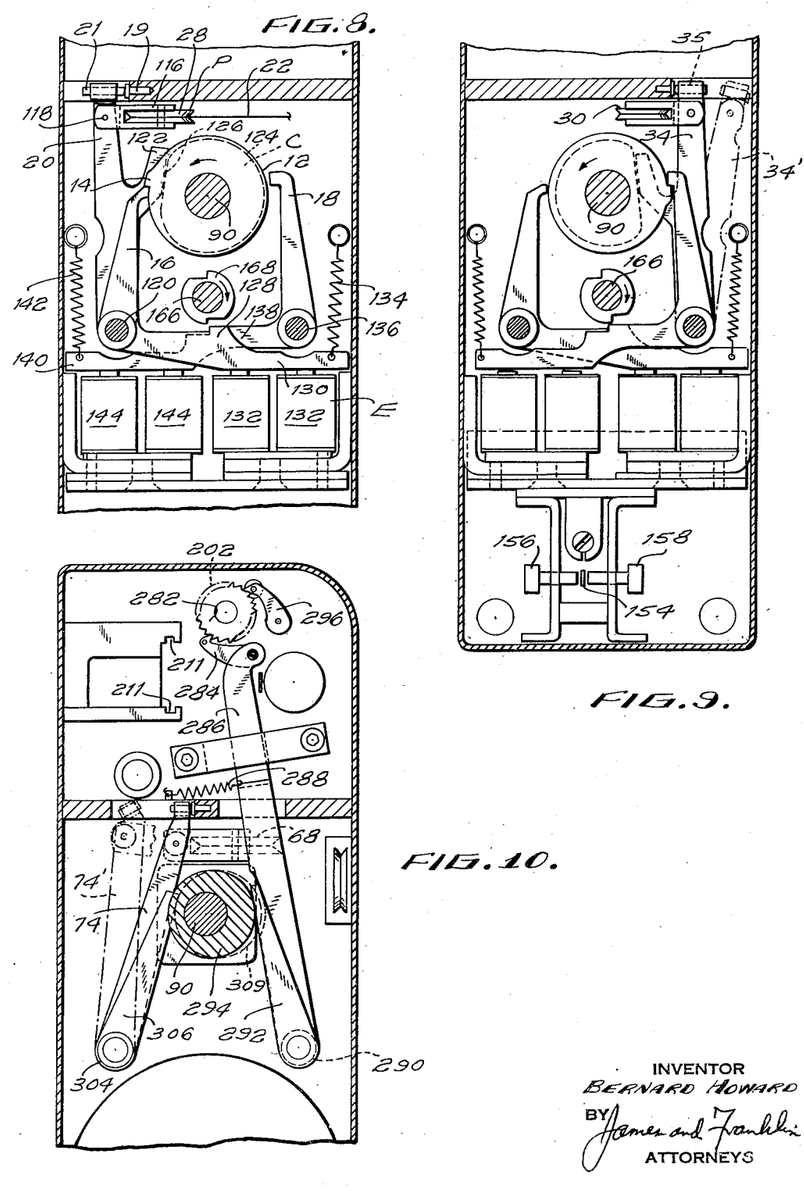
Fig. 8 is a fragmentary transverse vertical section taken approximately in the plane of the line 8—8 of Fig. 1.
Fig. 9 is a fragmentary transverse vertical section taken approximately in the plane of the line 9—9 of Fig. 1.
Fig. 10 is a fragmentary transverse vertical section taken approximately in the plane of the line 10—10 of Fig. 11.

The motor drives the cams by a continuous friction drive, with detents to prevent motion except when desired. In Fig. 1 the motor M operates continuously, and the cams C try to turn but are held back by detent mechanism. Referring to Fig. 8, the cam C is associated with a detent disc 12 having a detent tooth 14. This is arrested by either a stop 16 or a stop 18, thus putting the cam C in either of two positions, which in turn establishes either of two positions for a cam follower lever 20 with its pulley P, thereby effectively lengthening the cable 22 when the lever is in the "in" position shown, and effectively shortening the cable when the lever is moved by the cam to its "out" position.

The stops 16 and 18 are controlled by the electromagnets previously referred to. In comparison with the printer disclosed in my prior application Serial No. 339,119 it will be observed that the magnets need control only the detent action, and that the work of moving the pulleys, and consequently of moving the type body, is performed by the motor M.

*Cable and pulley system*

Figures 16, 17:
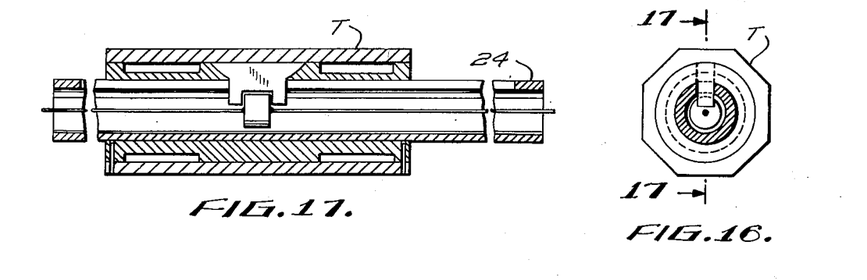
Fig. 16 is a transverse section through the hollow shaft carrying the type cylinder, drawn to enlarged scale.
Fig. 17 is a longitudinal section taken approximately in the plane of the line 17—17 of Fig. 16.
Figures 18, 21:
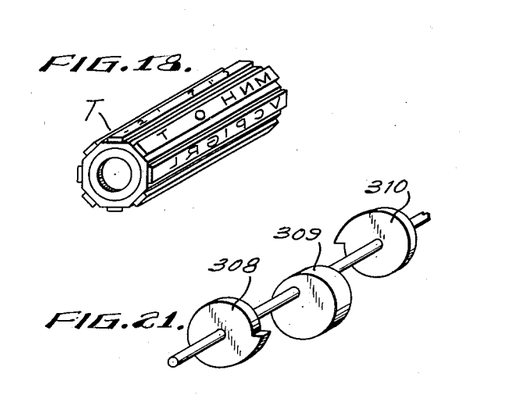
Fig. 18 is a perspective view of the type cylinder.
Fig. 21 shows a letter-figure shift cam, in schematic perspective.
Figure 19:
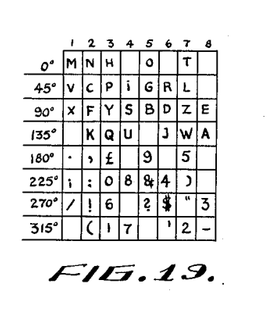
Fig. 19 is a development of the characters on the type cylinder.

The type body here employed is generally cylindrical, and the type selection involves both axial movement and rotation. Referring to Figs. 16, 18 and 19, there are eight lines of type, and eight characters along each line. Fig. 19 is a development of the surface of the type body, and it will be noted that in the upper four lines the characters are letters, while in the lower four lines the characters are numerals or punctuation marks. Some spaces are blank, and these correspond to certain special functions described later.

Figure 23:
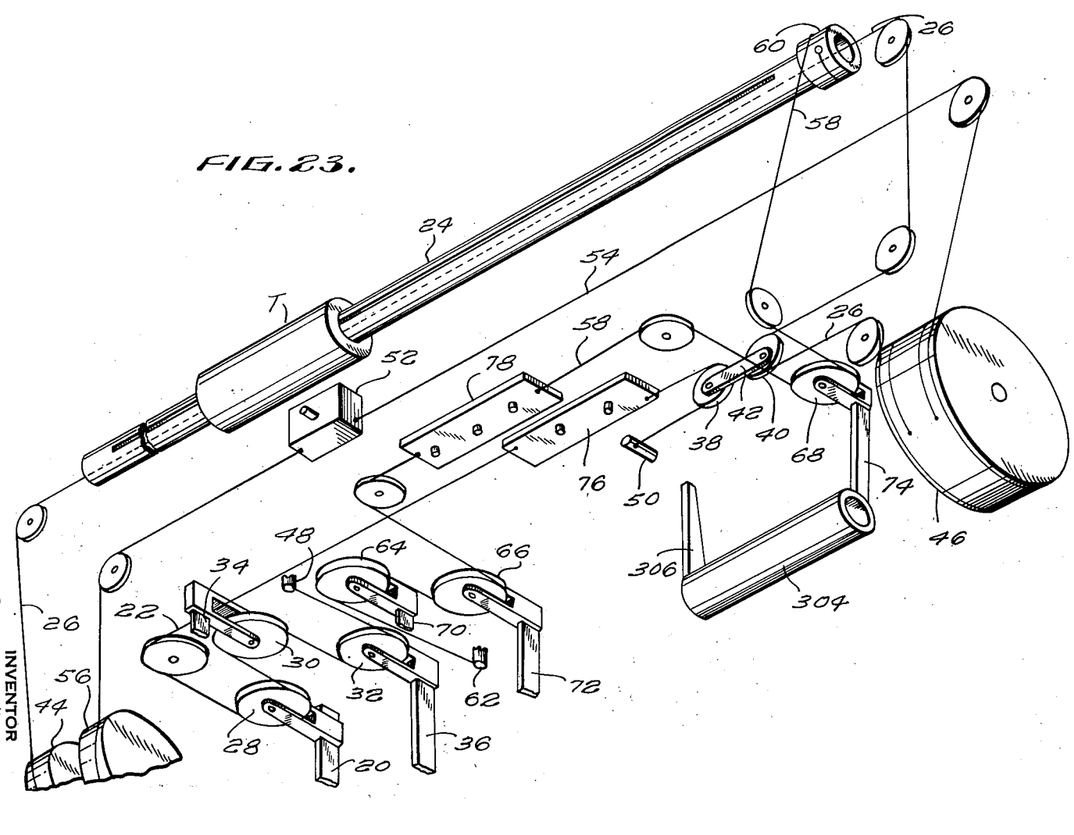
Fig. 23 is a schematic view, drawn in perspective, to help explain the cable and pulley arrangement used in the invention.

Referring now to Fig. 23, which is a perspective view looking from beneath the pulley system, the cylindrical type body T is slidable axially along a slotted hollow tubular shaft 24. The type body is moved axially by means of a cable 26 which is effectively shortened or lengthened for type selection by means of cable 22, which in turn is controlled by a group of three pulleys 28, 30 and 32. These are carried at the upper ends of vertical cam follower levers 20, 34 and 36. Cables 22 and 26 are coupled by pulleys 38 and 40 connected at 42, the assembly 38, 40, 42 being bodily movable.

To understand the action it may be assumed for a moment that cable 26 is connected directly to cable 22. The pulleys 28, 30 and 32 have movements which are multiples, in this case specifically $3/8''$, $3/16''$ and $3/32''$. Thus by moving one pulley or another to either its "in" or "out" position, eight axial positions of the type body T are obtainable, corresponding to the eight characters along any one line of type.

If the paper weer carried on a carriage which moves slidewardly relative to a fixed printing station, as in an ordinary typewriter, the cable 26 would be connected directly to the cable 22, as above supposed. However, in the present apparatus the paper does not move sidewardly, and instead the printing station travels across the paper. This requires a step-by-step feed movement which is provided by the cable 26. The left end of cable 26 is taken up on and supplied from a spring drum 44. The right end of cable 26 is wound up on a feed drum 46, which is turned step by step by ratchet mechanism described later. Thus the type body T is gradually drawn across the paper from one side to the other, but at the same time can fly back and forth for type selection as determined by the selector pulleys 28, 30 and 32. The cable 22 is stationarily anchored at both ends, as indicated at 48 for the left end, and at 50 for the right end.

The printing hammer is schematically indicated at 52, and it moves sidewardly with the type body T under control of a cable 54. The left end of this cable is supplied from a spring take-up drum 56, and the right end is wound on the feed drum 46, so that the hammer and type body move along together as they should.

Rotary selection of a character on the type body T is obtained by rotation of the hollow shaft 24, and this is under control of a cable 58, the upper end of which is wound about and secured to a drum 60 on shaft 24. The cable then passes around three selector pulleys to determine eight angular positions, and the lower or left end of the cable is fixedly secured as shown at 62. The selector pulleys are indicated at 64, 66 and 68, and are carried at the upper ends of generally upright cam follower levers 70, 72 and 74. The pulley 68 and lever 74 have the largest movement, in this case $3/8''$, which corresponds to 180° rotation of the type body. The pulleys 64 and 66 have movements of $3/16''$ and $3/32''$ respectively.

It may be mentioned that with the arrangement shown the movement of cable 22 is double the pulley movement, but the cable movement is again halved at the coupling 42, so that the movement of the type body corresponds to that of the pulley causing the movement. However, in the case of the rotary selection the cable movement remains doubled, and thus the drum 60 may have a circumference of $1\frac{1}{2}''$, in which case a pulley movement of $3/8''$ at the pulley 68 will produce a cable movement of $3/4''$ or a half rotation of the type drum shaft.

To provide for certain special functions a movable bar 76 is connected in cable 22, and a movable bar 78 is connected in cable 58. These bars carry register buttons which are slidable transversely of the strip. When these buttons come into alignment in a particular position they serve to initiate one or another of certain special functions, as will be described later. It is primarily to make these special functions independent of whether the type bar is printing letters or numerals, that the movable pulley 68 preferably is spaced as shown from the movable pulleys 64 and 66, thus permitting the strip 78 to be interposed ahead of the pulley 68, so that the position of strip 78 is not affected by the position of pulley 68, or, differently stated, by whether the machine happens to be printing letters or numerals. Moreover, pulley 68 itself responds a special combination of telegraph signal pulses, as a special function, and has no magnet for direct control of its "in" or "out" position, as is the case with the other five cable controlling pulleys.

Figure 2:
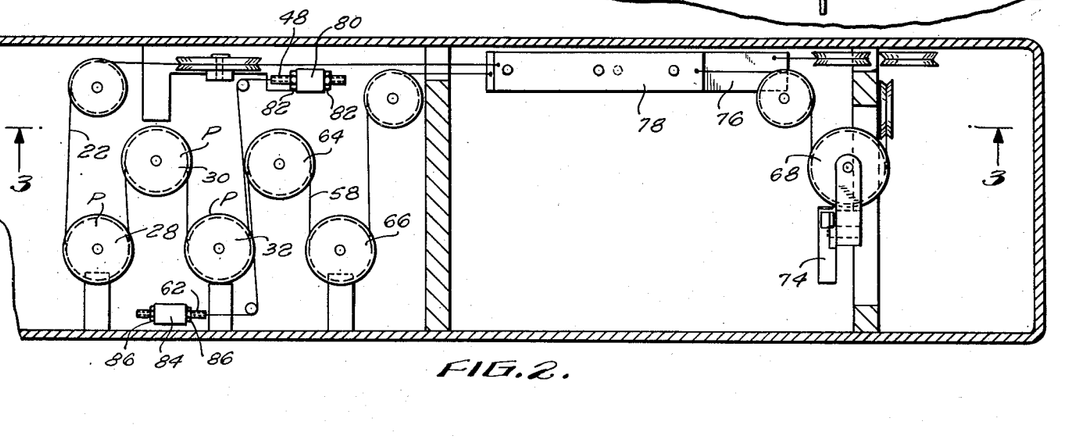
Fig. 2 is a horizontal section taken approximately in the plane of the line 2—2 of Fig. 1.

The pulley system is shown in plan view in Fig. 2, and referring to that figure it will be seen that the anchorage 48 at the fixed end of cable 22 is preferably made adjustable, as by means of a threaded rod slidable through a stationary boss 80, and adjusted by means of nuts 82. Similarly the fixed end 62 of cable 58 is connected to a threaded rod which is slidable in a stationary boss 84, and adjusted by means of nuts 86. Fig. 2 also shows how the bars 76 and 78 are disposed one over the other, so as to make possible occasional registration of the register buttons carried thereby.

*Cam and detent system*

Referring to Fig. 1, the cams are all carried on a single shaft 90, which is continuously driven by motor M, through a gear reduction train comprising a pinion 92 meshing with a gear 94, which turns a pinion 96 meshing with a gear 98, carried at one end of the shaft 90. The shaft is rotatable in bearings 100 and 102 carried in appropriate support walls 104 and 106. The cams are secured to or formed integrally with detent discs as previously mentioned, and these are not keyed to the shaft, but are disposed between friction discs which are keyed to the shaft. The discs and cams are all squeezed axially. In the present case the cams to the left of wall 109 are squeezed between a compression spring 108 and a disc 110 pinned to the shaft. The cams to the right of wall 109 are squeezed between a compression spring 111 and a disc 112 pinned to the shaft. The friction may be adjusted by means of locked or jammed pairs of nuts 113, 114. More friction may be provided for the righthand group of cams for special functions.

Referring now to Fig. 8, the pulley 28 is carried in a yoke 116 connected at 118 to the upper end of lever 20, the lower end of which is pivoted at 120. The lever 20 is formed integrally with a cam follower portion 122 which bears against cam 124. This has a flat at 126, so that in the position shown the pulley 28 is in its righthand or "in" position. When the cam rotates a half turn the pulley is moved to the left or to its "out" position.

The detent stop 16 forms a part of an angle lever which is pivoted at 120. The lower arm 128 of the angle lever is extended to the right to form a magnet armature 130 which may be held down by a U magnet 132, against the pull of a spring 134. Similarly the stop 18 forms a part of an angle lever pivoted at 136 and having a lower arm 138 extended to form an armature 140 urged upward by a spring 142, and cooperating with a U magnet 144. It will be evident that de-energization of the magnet 132 will be followed instantly by rotation of cam 124 until the detent tooth 14 reaches stop 18, whereupon the cam will be arrested. The relation of the stop and detent tooth then is as shown in Fig. 9, although that figure shows the next pulley 30 with its cam follower lever which is movable between the "in" position 34 shown mostly in solid lines, and the "out" position 34' suggested in broken lines. In other respects the arrangement is like that already described, it being understood that each cam has its own detent disc, and two stops, and two control magnets for the same. The cams, of course, differ in shape in order to produce the multiple displacements already mentioned, which in this case are specifically 3/32", 3/16" and 3/8".

Reverting to Fig. 8, the "in" position of the cam follower lever 20 is determined by a stop 19, and may be adjusted by means of a stop screw 21 carried by the upper end of lever 20. Thus the precision of the type selection does not depend on the cut of the cam, which instead may be made slightly smaller than desired for the "in" position, the latter position then being determined more accurately by adjustment of the screw 21. A similar adjustment is provided for each of the pulley carrying levers as will be seen in Fig. 9 by screws 35 at the upper end of lever 34.

Reverting to Fig. 8, the foregoing description is written as though there were a single disc 12 and tooth 14, but in fact there are two such discs, each with a tooth, and the cam is disposed between the discs, all three parts being secured together, as by means of one or more pins or rivets, not shown. Referring to Fig. 1, attention is called to the short horizontal double-headed arrows which each represent one such assembly, the said assembly comprising a cam C secured between two discs. Reverting to Fig. 8, this is done because the detent stops 16 and 18 are displaced from one another in order to provide room for the armatures 130 and 140, which are side by side and therefore necessarily displaced from one another. However, it will be understood that a single disc and tooth could be used, with the detent stops 16 and 18 disposed in a common plane, and with the armatures 130 and 140 offset or displaced from the stops 16 and 18 at the hubs on pivots 120 and 136.

*Sequence control*

As so far described the apparatus could be operated in response to a perforated tape, the five levels of perforation controlling the five cams and pairs of magnets, with resulting simultaneous shift of the pulleys to produce the desired character selection on the type cylinder. This would require the use of a perforator arranged to follow signals the pulses of which are received in sequence. In accordance with a further feature of the present invention the apparatus is arranged to operate directly in response to the sequential code pulses. Thus, referring to Fig. 22, the telegraphic signal is received over a wire or wireless circuit, and is applied from line 150 to a relay 152 which vibrates an armature 154 between stationary contacts 156 and 158.

Figures 20, 22:
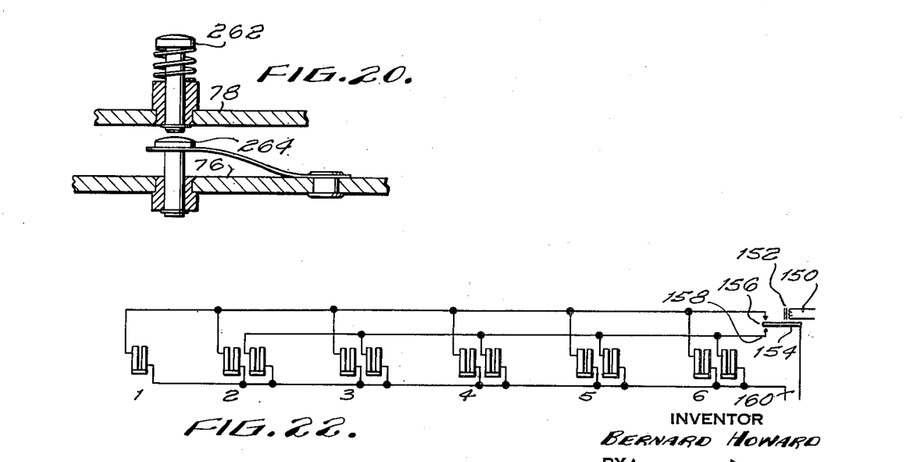
Fig. 20 is a section through superposed register buttons like those shown in Fig. 13, but drawn to much larger scale.
Fig. 22 is a wiring diagram explanatory of the invention.

The armature and contacts form part of a power supply circuit connected to a source at 160. Contact 156 is connected in common to the magnet 1, and to all of the lefthand magnets of the pairs marked "2," "3," "4," "5" and "6," while contact 158 is connected to all of the righthand magnets of the pairs. Without a sequence control or distributor means, all of the cams and pulleys would be simultaneously moved into their "in" position or their "out" position, depending on whether the telegraph signal is a mark or a space. Instead, a first or synchronizing signal initiates operation of a sequence shaft in proper time relation to distribute the succeeding five signals to the successive cams.

Referring now to Fig. 1 of the drawing it will be seen that the cam shaft 90 carries a gear 162 which meshes with a gear 164 mounted on a sequence control shaft 166. This carries a series of sequence control cams which are shown in simple cylindrical or blank form in Fig. 1.

Referring now to Fig. 8, a typical sequence control cam is seen at 168. The cams may be all alike, but are displaced rotationally from one another. In the present case the sequence shaft 166 turns in one-to-one ratio with the cam shaft 90, in which case the cams are 30° apart, thereby providing six increments in a half revolution of the shaft. In the position shown in Fig. 8 it will be seen that angle lever 128 is free to move up, on de-energization of magnet 132. However, the resulting release and rotation of detent tooth 14 are followed by restoration of lever 128 to the "down" position shown, because of the action of the cam 168. During five-sixths of the half revolution of cam 168 the detent cannot be released even though the magnet may be de-energized repeatedly. Thus the main purpose of the cam 168 is to make the magnet circuit inoperative to control the detents except during a single mark or space period, corresponding or allotted to the particular cam being considered.

The sequence cams also fulfill other useful functions. One is to restore the armature to the magnets so that the energization of the magnets need only be sufficient to hold the armature after it has been moved to the magnet poles. This is a much smaller energization than would be required to actually pull the armature down to holding position. Another is to prevent needless chatter or vibration of the armatures in response to signal pulses directed to the control of other cams, during the half rotation of the detent disc last released.

The operation of the sequence shaft presupposes rotation of the shaft in synchronism with the signal pulses from the transmitter. The drive of the motor M is readily held to synchronism within a wide tolerance of, say, 5%. Such a tolerance is safe because the present apparatus will respond properly despite an even wider error going up substantially to 14%.

Figure 7:
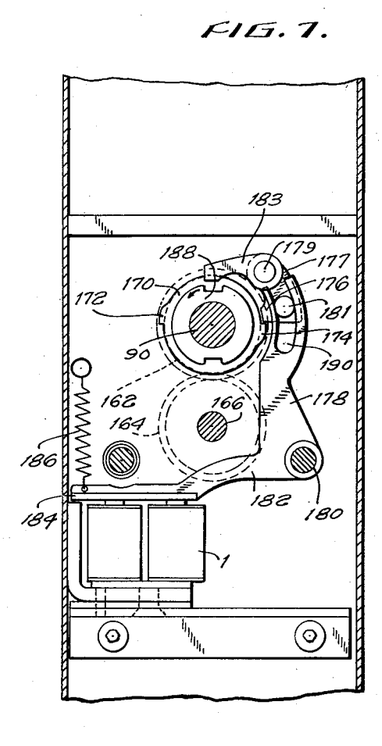
Fig. 7 is a partial transverse vertical section taken approximately in the plane of the line 7—7 of Fig. 1.

Referring now to Fig. 7 of the drawing, the gear 162 on cam shaft 90 is driven frictionally and is formed with or secured to a detent disc 170 having diametrically opposed detent teeth 172 and 174. These cooperate with a stop tooth 176 carried by an arm 177 pivoted at 179 and having a pin 181 received in an arcuate slot 190 formed in the upper end of the arm 178 of an angle lever pivoted at 180 and having a horizontal arm 182 which is extended to form an armature 184 cooperating with magnet 1. The armature is urged upward by a spring 186, and it is evident that when the magnet is de-energized the arm 178 moves arm 177 and tooth 176 outward, whereby disc 170 is released for a half revolution, thus permitting gear 162 to drive gear 164 and so to drive the sequence shaft 166 for a half revolution. Arm 177 is integral with an offset arm 183 cooperating with a cam 188. The cam is secured to and turns with the detent disc 170. It restores the tooth 176 and armature 184 to holding position promptly after their release.

Figure 5:
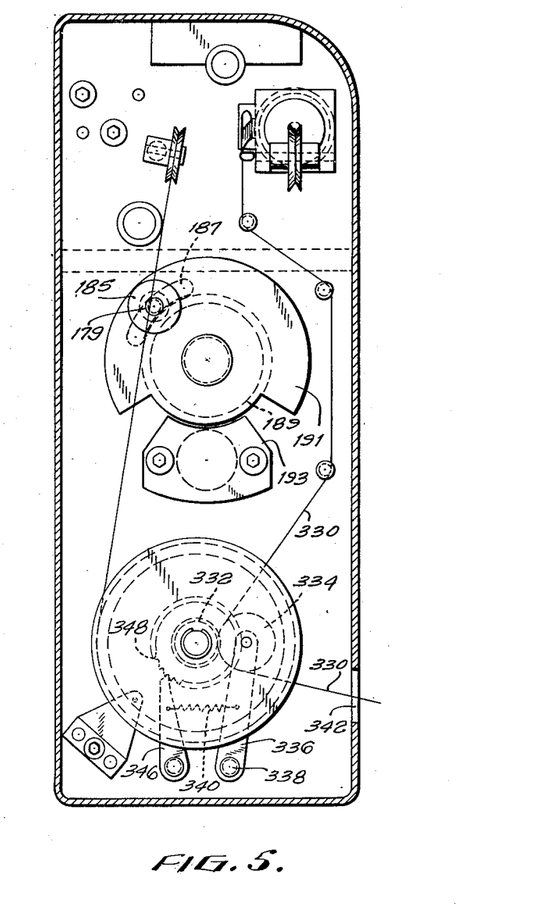
Fig. 5 is a transverse vertical section taken approximately in the plane of the line 5—5 of Fig. 1 and Fig. 6, the latter showing parts omitted in Fig. 1.
Figure 6:
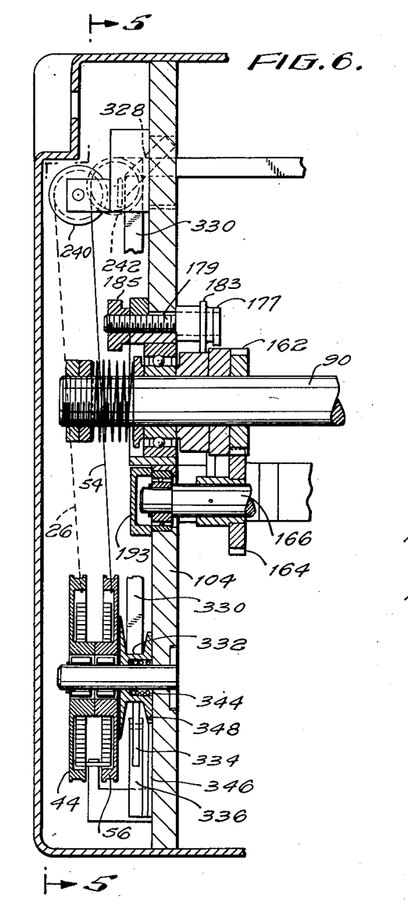
Fig. 6 is a fragmentary vertical section corresponding generally to the lefthand end of Fig. 1 but drawn to larger scale and showing parts not shown in Fig. 1.

It will be understood that the transmitted signal is divided into six spaces or time increments, of which the first is for synchronization, and the next five determine the character to be printed. The synchronization may be adjusted over a considerable range by movement of the stop tooth 176 around shaft 90. This is done by moving the pin 179 in an arcuate slot, and locking it in desired position. Fig. 6 shows an extension of shouldered pin 179 pasing through wall 104 and provided with a knurled nut 185. Fig. 5 shows the arcuate slot 187 through which pin 179 passes. It also shows a hub 189 having a flange 191 partially cut away to receive a stationary stop 193. The flange moves with the pin 179 and nut 185, and the motion is limited by stop 193. Fig. 1 shows how hub 189 is rotatably received in wall 104, with flange 191 held against the wall. This arrangement takes care of the inductive or capacitative characteristic of the telegraph line, which may cause a lag and/or lead because of a distortion in the shape of the pulses which, instead of being square, tends to go toward a saw-tooth facing in one direction or the other.

Any gradual departure from synchronism thereafter is counteracted or prevented from becoming cumulative by the fact that the sequence control shaft is momentarily arrested at the end of a half revolution, and again released in synchronism. It will also be understood that the sequence control cams for the next five magnets are angularly displaced from one another by 30°, so that each signal pulse will control only its appropriate magnet, and thus affect only the appropriate cam and pulley for proper type selection.

The vibratile armature 154 (Fig. 22) with its contacts 156 and 158 are also shown at the bottom of Fig. 9, and the magnet structure for operating the armature is shown at 152 in Fig. 1. Thus the relay is compactly disposed directly beneath the pairs of control magnets number 1 through 6.

Fig. 8 is somewhat unreal in showing both armatures 130 and 140 down while sequence cam 168 is in release position. If magnet 144 is energized then magnet 132 is de-energized, and vice versa. One armature will rise when the cam 168 reaches the position shown. With the pulley in the "in" position shown, if armature 140 rises there is no change of pulley position, and if armature 130 rises there is a change in pulley position.

Fig. 9 is more precise in showing the left magnet de-energized and the left armature attempting to rise, as it will when shaft 166 turns the least bit further.

*Printing and feed*

Figure 13:
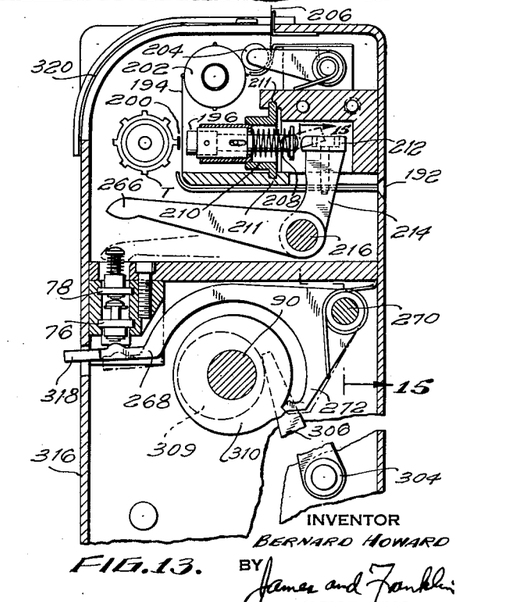
Fig. 13 is a fragmentary transverse vertical section taken approximately in the plane of the line 13—13 of Fig. 14.

Referring to Fig. 13, the paper is fed into the machine from the rear at 192, and passes upwardly at 194 between the type cylinder T and a hammer 196. An ink ribbon 200 is disposed between the paper 194 and the type cylinder T, thus causing the hammer to print a character on the paper, the characters on the type cylinder being in reverse or mirror image, as will be seen in Fig. 18. The paper 194 then passes around a feed cylinder 202, and beneath a pressure roller 204, and thence upwardly out of the machine at 206. Roller 202 is preferably sprocketed, and the paper is marginally perforated to match.

The hammer 196 is normally retracted by a spring 208, it being reciprocable in a housing carried by a slide 210, movable in top and bottom grooves or tracks 211 so that it can travel from one side of the paper to the other. In Fig. 23 the entire hammer assembly is marked 52. At any point along its travel the hammer may be struck by a bar 212 (Fig. 13) carried at its ends by arms 214 pivoted at 216. Track 211 is shown also in Figs. 10 and 12.

Figure 12:
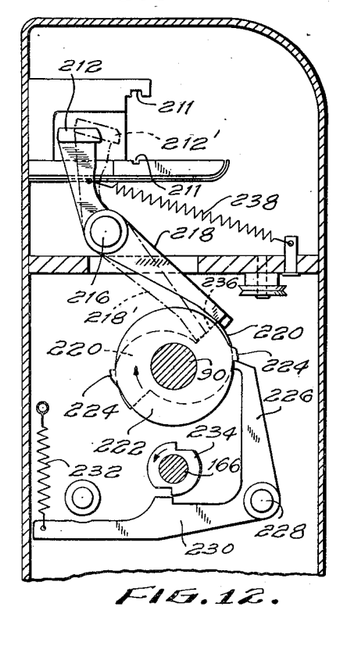
Fig. 12 is a fragmentary transverse vertical section taken approximately in the plane of the line 12—12 of Fig. 14.

Referring now to Fig. 12, it will be seen that the rod 216 which carries the hammer bar 212 also carries a cam follower arm 218 cooperating with a cam 220 (mostly dotted) carried on the main cam shaft 90. Cam 220 has two lobes, so that the printing hammer is operated once for each half revolution of cam shaft 90. The cam is formed integrally with or secured to a detent disc 222 having diametrically opposite detent teeth 224, cooperating with a stop arm 226, pivoted at 228, and forming a part of an angle lever having another arm 230, the free end of which is pulled upward by means of a spring 232. Arm 230 cooperates with a sequence cam 234 on sequence shaft 166. No magnet is employed, and instead the cam 234 controls the detent action directly.

More specifically, following completion of type selection the sequence cam reaches a position slightly beyond that shown in Fig. 12, whereupon spring 232 pulls the stop 226 out, and permits friction drive of cam 220. Cam follower 218 immediately thereafter reaches the sharp drop 236 of the cam, and so moves inward abruptly from the solid line position to the broken line position 218', under the pull of spring 238. This causes the hammer bar to move to the broken line position 212', during which movement it hits the hammer and paper against the ink ribbon and type, thus printing a character.

This does not interfere with subsequent travel of the hammer relative to the paper, because a part of the hammer stroke is by momentum. Reverting to Fig. 13 it will be seen that there are two relatively movable parts of the hammer connected by a pin and slot connection such that when the hammer is struck forward the end portion 196 may travel further than it is moved by the hammer bar 212, whereupon it is immediately retracted partway by the spring, and the rest of the way later as the hammer bar is moved back by its actuating cam 220 shown in Fig. 12.

Immediately following the printing operation the type cylinder and the hammer are advanced the spacing of one character, preparatory to the next printing operation. Reverting to Fig. 23 it will be recalled that for this feed the cables 26 and 54 are taken up step by step on a feed drum 46, and at the same time are unwound at the other end from spring take-up drums 44 and 56.

Referring now to Fig. 6 of the drawing, the spring take-up drums are shown at 44 and 56, with the cables 26 and 54 leaving the same. The cables turn to horizontal position around guide pulleys 240 and 242. One cable runs axially through the hollow tube which carries the type cylinder. The other cable is connected to the slide assembly which carries the hammer.

Figure 4:
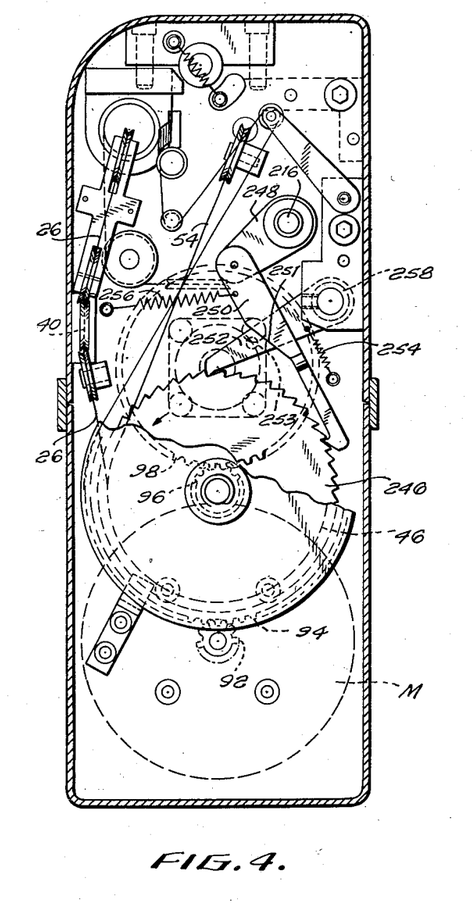
Fig. 4 is a transverse vertical section taken approximately in the plane of the line 4—4 of Fig. 1.

Referring to Fig. 1, the cable 26 turns downward about pulley 244 and is wound about feed drum 46. The other cable (not shown) is similarly fed downward to feed drum 46. This drum carries a ratchet wheel 246. Referring now to Fig. 4 of the drawing, the rod 216 which carries the hammer bar as was described with reference to Figs. 12 and 13, also carries an arm 248, which in turn carries a pawl 250, which at its lower end cooperates with the ratchet wheel 246 of the feed drum. On reflection it will be seen that during the printing operation the pawl moves down, and on the return from the printing operation the pawl moves upward, and so turns the feed drum, and so moves the type cylinder and the hammer one step across the paper.

The ratchet wheel 246 is held against return movement by means of a check pawl 252, normally pulled downward by a spring 254. The feed pawl 250 is normally urged inward by a spring 256. Check pawl 252 has a pin 253 which cooperates with a surface 251 on pawl 250. This is so that lifting of check pawl 252 for carriage return, as later explained, will automatically raise pawl 250 at the same time.

Referring to Fig. 1, the cam follower arm 218 is located about midway between the hammer bar arms 214, and the cam 220 is a part of the left group of cams, so that its control or release cam 234 may be mounted on the sequence shaft 166. Cams 220 and 234 were described above in connection with Fig. 12.

*Carriage return*

Figures 14, 15:
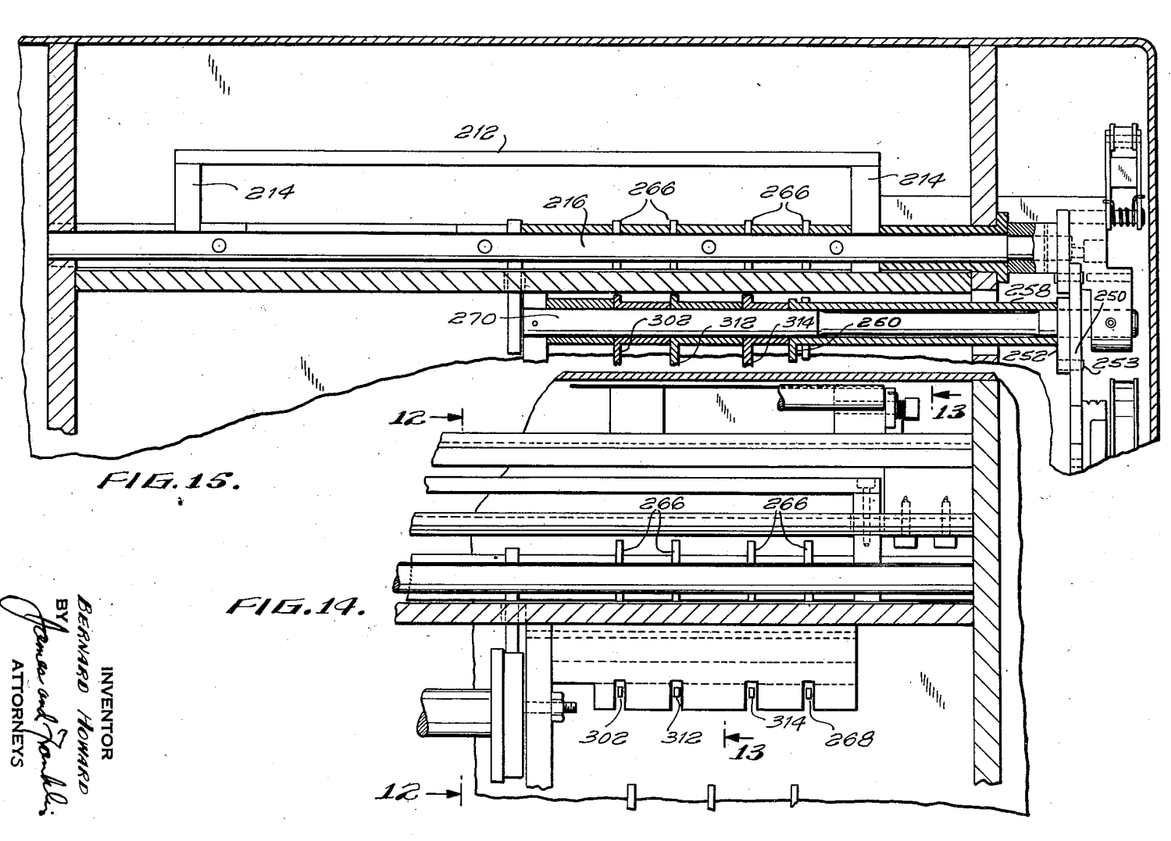
Fig. 14 is a fragmentary elevation corresponding to the upper righthand part of Fig. 1, but taken in front of the register strips.
Fig. 15 is a vertical section through the hammer bar and its actuator shaft.

The message from the transmitter is printed at the receiver in line-for-line copy. For this purpose the end of a line is signalled, thereby causing carriage return at the printer. This is one of a number of special functions, which are indicated by a signal corresponding to a blank space on the type cylinder. To bring about carriage return it is merely necessary to raise the check pawl 252 (Fig. 4) from the ratchet wheel 246. For this purpose the check pawl 252 is mounted on a torque tube 258. Referring now to Fig. 15, it will be seen that this torque tube 258 extends sidewardly to a cam follower 260, only a fragment of which is shown, and which cooperates with a cam on the cam shaft.

Figure 3:
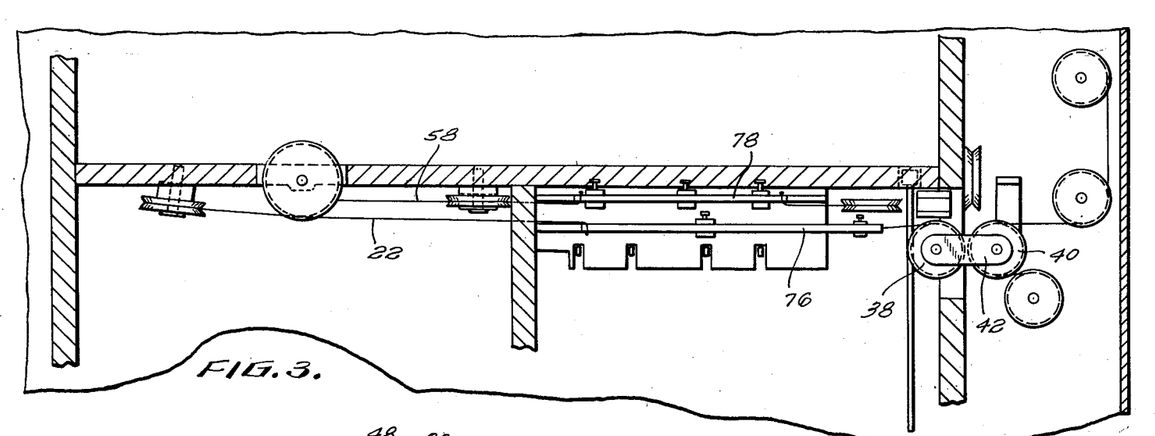
Fig. 3 is a fragmentary vertical section taken approximately in the plane of line 3—3 of Fig. 2.

The manner in which any of the special functions is initiated may be described with reference to Fig. 23. It will be recalled that there are bars 76 and 78 which fly back and forth with the selector cables, and which carry register buttons. Figs. 2 and 3 show the superposition of bars 76 and 78, with the register buttons carried thereby, the bar 76 having two buttons, and the bar 78 having three buttons. Referring now to Fig. 20, two of the buttons are there shown in enlarged scale. The button 262 of bar 78 is shown directly above the button 264 of bar 76. The buttons are resiliently urged upward by springs, as shown.

Referring now to Fig. 13, it will be seen that there is a pusher finger 266 disposed above the bars 76, 78, the said finger being carried by the rod 216 which carries the hammer bar 212. This part of the drawing also shows how the bars 76 and 78 are freely slidably carried in guide tracks receiving the side edges of the bars. An arm 268 is disposed beneath the bars, the said arm being pivoted at 270 and carrying a detent stop 272 cooperating with a detent disc 310 controlling a cam 309 frictionally driven by the main cam shaft 90.

There are four pushers 266 disposed collaterally, and all carried by rod 216 (Figs. 1, 11, and 15), and similarly there are four arms much like the arm 268, located respectively beneath the pushers 266, and controlling four different detent discs. The pushers 266 all move downward together at each printing operation, but ordinarily nothing happens because an upper register button may not be aligned with a pusher, or a lower button may not be aligned with an upper button, or the buttons may not be aligned with a detent arm like arm 268. However, in response to certain predetermined signals the type cylinder will be moved to a blank space, thus making the hammer inoperative, and a top and bottom register button will be superposed and also aligned with a pusher and a detent arm, in which case a special function cam is released, and produces the desired special function under motor drive.

Referring to Fig. 1, in the case now under consideration a special function cam 280 is released, and operates on cam follower 260, which through its torque tube 258 (Fig. 15), releases the check pawl 252 (Fig. 4) of the feed ratchet 246 and drum 46, whereupon the springs in the return drums 44 and 56 (Fig. 6) pull up the cables and so return the type cylinder and the hammer assembly back to starting position near the left side of the paper. These are not the parts shown in Fig. 13, which are for a different function, causing change from letters to figures.

*Paper feed*

In connection with Fig. 13 it will be recalled that the paper is fed upwardly by means of a drum 202 in order to space one line from the next. The drum 202 preferably has sprocket pins, and the paper preferably has sprocket holes along its edges mating with the sprocket pins.

Referring now to Fig. 10, the feed cylinder 202 is turned by a ratchet wheel 282, moved by a feed pawl 284, carried by a pawl arm 286, pulled to the left by a spring 288. The lower end of said arm is connected to a torque tube 290, the other end of which tube is connected to a cam follower arm 292, cooperating with a cam 294 on the main cam shaft 90. A check pawl 296 also engages the ratchet wheel 282.

Figure 11:
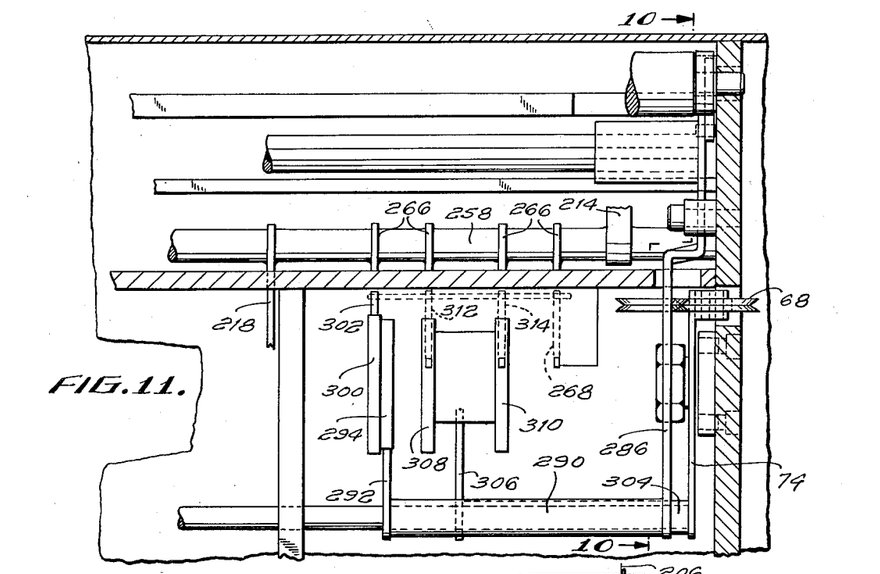
Fig. 11 is an elevation corresponding to the righthand end of Fig. 1, but simplified by omitting the cam shaft and most of the cams.

Referring now to Fig. 11, the cam 294, cam follower 292, torque tube 290, and the long upwardly extending pawl arm 286 are all shown, the latter being offset at its middle portion. Cam 294 is controlled by a detent disc 300, which in turn is controlled by stop arm 302. The stop arm is one of the arms like arm 268 (Fig. 13) underlying the pushers 266 and register buttons. This detent arm which serves for paper feed or line spacing, is preferably projected forwardly through a slot in the front wall 316 of the casing, as shown at 318 in Fig. 13. This is a desirable convenience because it permits an observer, on looking through the transparent window 320 at the printing, to depress lever 318, thus feeding out paper continuously from the machine preparatory to tearing off a message. This is done, if at all, between messages which are to be separated from one another.

*Shift between figures and letters*

Reverting to Fig. 23, it will be recalled that the shift between figures and letters is caused by movement of a pulley 68 carried at the upper end of a lever 74. These parts are also shown near the right end of Fig. 2. Referring now to Figs. 10 and 11, pulley 68 is carried at the upper end of lever 74, the lower end of which is connected to a torque tube 304. Fig. 10 also shows the adjusting screw at the upper end of lever 74 to adjust the "in" position of the pulley. The "out" position is 74'. The other end of torque tube 304 is connected to a cam follower arm 306 which cooperates with a cam 309. The rotation of the cam 309 is controlled by two detent discs 308 and 310, which in turn are controlled by detent stops 312 and 314. These underlie the register buttons and pushers.

Referring now to Fig. 21, the detent discs each have one tooth, and the teeth are 180° apart. Both discs are fixed to cam 309, and all turn in unison under friction drive from the motor. In response to a particular signal the detent stop 312 (Fig. 11) is released, thereby letting detent stop 314 put the pulley 68 in position for the type cylinder to print numerals or figures, whereas in response to another signal the detent stop 314 is released, thereby letting stop 312 put the pulley 68 into position to print letters. In Fig. 13 the cam 309 is shown cooperating with cam follower lever 306, which is connected to the torque tube 304 previously referred to in connection with Fig. 11.

*Ink ribbon feed*

The ink ribbon may resemble a typewriter ribbon, and if desired may be fed in one direction, and then back in reverse direction, as in a conventional desk typewriter. However, in the apparatus here shown it is fed in only one direction.

Referring to Fig. 1, the ink ribbon is shown at 322, it being taken from a reel 324 housed at one end of the printer. The ribbon is fed upwardly and guided angularly over turning bars as shown at 326, and then fed horizontally with the ribbon in a vertical plane, as shown at 200 in Fig. 13. Referring to Fig. 6, at the other end of the machine the ribbon is again turned angularly on turning bars as shown at 328, and runs downward as shown at 330. It may be wound up on a reel, or as here shown, fed out of the machine, the ribbon being pulled by a drum 332. Referring now to Fig. 5, the used ribbon 330 is fed between drum 332 and a pressure roll 334, the latter being carried on an arm 336, pivoted at 338, and pulled sideward by a spring 340. The ribbon is discharged through a window 342.

Reverting to Fig. 6, the motion of drum 332 may be obtained from the spring take-up reels 44 and 56. These are moved as the type cylinder and hammer are moved across the paper, and thus the ribbon is correspondingly moved, though in smaller amount because of the difference in diameter between the cable supply drum 56 and the ribbon feed drum 332. The drive of the latter drum is frictional, it being urged axially by means of a compression spring within its hub as shown at 344. The feed drum 332 is held against return movement by suitable ratchet teeth 348 (Figs. 5 and 6) and check pawl 346. In Fig. 5 it will be seen that spring 340 is connected to the check pawl 346 engaging ratchet teeth 348. These are formed on one flange of drum 332. They prevent rotation of the ribbon feed drum in reverse direction during return of the type cylinder and hammer to the starting edge of the paper.

*Modified drive for cams*

As so far described the cams, although operated only intermittently, are driven frictionally. This has the disadvantage of dissipating motor energy in friction and heat. The difficulty may be overcome by employing clutches for the cams, instead of continuous friction. A clutch which I have employed, and which is very suitable for this purpose, may be explained with reference to Figs. 24 and 25 of the drawing. Referring to those figures, the main motor driven shaft is indicated at 390, and corresponds to the shaft 90 in Fig. 1. A typical cam 394, with a flat at 396, corresponds to the cam 124 and flat 126 in Fig. 8. The cam is formed integrally with or is secured to an overrunning clutch member 398, which cooperates with a retainer 400 carrying a number of spaced balls, in this case three balls 402.

Figure 24:
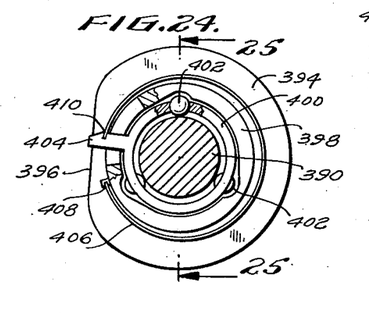
Figs. 24 and 25 are transverse and longitudinal sections explanatory of a modified form of cam drive.
Figure 25:
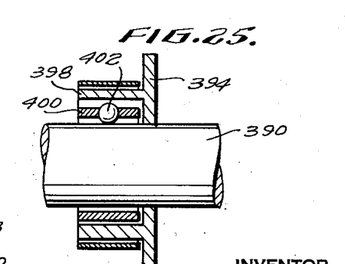

The retainer 400 has a stop finger or tooth 404, corresponding to the tooth 14 in Fig. 8. The clutch member 398 has wedging surfaces formed on the inner face thereof at each of the balls 402, as will be seen in the drawing, and these are properly sloped to be self-wedging or jamming under load, keeping in mind that the load is the cam 394 secured to the member 398, and that the driving shaft 390 turns counterclockwise as viewed in the drawing. The clutch is completed by an annular leaf spring 406, one end of which is secured to the member 400 as indicated at 408, and the other end of which bears against the tooth 404 at 410.

On reflection it will be evident that when a detent stop, typically the stop 16 (or 18) shown in Fig. 8, bears against the tooth 404 (Fig. 24), the clutch member 398 is held against rotation, and the shaft 390 turns freely. It may spin the balls 402 idly but cannot move them into the sloping or wedging surfaces of member 398. However, when the detent stop releases the tooth 404 for a half rotation, the member 400 and the balls 402 immediately advance into and against the wedging surfaces of member 398 and drive the latter, together with the cam 394, for the desired half revolution, at which time the tooth 404 is again stopped by the opposite detent stop or hook. That stoppage moves the balls from the sloping or wedging portions to the clearance portions of member 398, whereupon the shaft 390 continues to rotate freely.

It will be understood that the described clutch may be used also between the cam shaft and the sequence shaft, that is for control of the drive shown in Fig. 7, as well as for the drives shown in Figs. 8 and 9.

*Operation*

Referring to Fig. 1, the motor M continuously drives the cam shaft 90, but the cams remain stationary because of the detent action at each cam. The incoming telegraphic or code signal is applied to relay 152, and results in operation of magnet 1 to release the detent of gear 162, thus turning the sequence shaft 166 through a half revolution. As the sequence shaft turns it successively makes it possible for the detents of the successive cams to function, provided the signal acting on the successive magnets 2—6 calls for a change in pulley position. The resulting changes in pulley position cause the type cylinder to shift axially and to rotate to select the next desired character, whereupon the hammer presses the paper against the ink ribbon and the selected character, following which the type cylinder and hammer are advanced one step sideward preparatory to the next selection and printing operation. The operation of the sequence shaft is kept in synchronism with the incoming signal because its timing is checked every half revolution in relation to the signal. The motor M is operated synchronously, but the synchronism need not be perfect, and considerable tolerance is allowable, because there is no cumulative error.

Special functions are those produced without a special detent control magnet (meaning magnets 2—6). Carriage return is obtained by releasing the check pawl and feed pawl of the cable drum 46, thus permitting the spring drums 44 and 56 at the other end of the machine (not shown in Fig. 1 but shown in Fig. 6) to pull the cables back to starting position. Paper feed or line spacing is another special function, and is made separate from carriage return in order to make it possible to advance the paper a series of line spacings when desired, as for example, between messages. It is obtained by the mechanism shown in the righthand and upper part of Fig. 10. The shift of the type cylinder one-half turn between letters on one side, and numerals on the other side, is also a special function obtained in response to a signal from the transmitter.

The power for shifting the selector pulleys is obtained from the motor M. Similarly the power for the printing hammer, for carriage movement, and pawl release for carriage return, and for line spacing, is obtained from the motor M. All that the magnets 1 through 6 need control are the cam detents, and even there they need only release the stops, the return of the magnet armature to magnet holding position being under drive of the motor, so that the magnetic force required of the magnets is minimized.

It is believed that the construction and operation of my improved telegraph printer, as well as the advantages thereof, will be apparent from the foregoing detailed description. It will also be apparent that while I have shown and described my invention in a preferred form, changes may be made in the structure shown without departing from the scope of the invention, as sought to be defined in the following claims. In the claims the flexible strand which passes around the selector pulleys is referred to as a cable, but it will be understood that any non-stretching flexible strand may be used, such as a wire, a wire cable, or cord made of twisted synthetic fibres of inelastic character, or a chain, and the latter may be a sprocket chain or universally flexible ball chain. In the latter case the pulleys may be recessed about their periphery to mesh with the ball chain.

I claim:

1. In a telegraph printer, a type body having a plurality of characters to be printed, a cable connected to the type body for moving the same to select the character to be printed, a plurality of pulleys about which the cable is trained in series, a series of rotatable cams, there being a cam for each pulley, motor means for rotationally driving any of said series of cams to either of two positions, magnetic means associated with each cam to make the motor means operative for that purpose, cam follower levers positioned near the camming surfaces of said rotatable cams and carrying the aforesaid pulleys to move the same between either of two positions in a direction to effectively shorten or lengthen the cable, the effective cable change produced by one of said cams and pulleys being double that produced by another, and electrical circuits to energize said magnetic means in appropriate combinations to select the desired character to be printed.

2. In a telegraph printer, a type body having a plurality of characters to be printed, a cable connected to the type body for moving the same to select the character to be printed, a plurality of pulleys about which the cable is trained in series, a cam shaft, a motor for driving said cam shaft, a series of intermittently driven cams spaced axially therealong there being a cam for each pulley, a pair of detents for each cam for holding said cams in either of two positions, cam follower levers positioned by the camming surfaces of said cams and carrying the aforesaid pulleys to move the same between either of two positions in a direction to effectively shorten or lengthen the cable, the effective cable change produced by one of said cams and pulleys being double that produced by another, magnets associated with said detents, and electrical circuits to energize said magnets in appropriate combinations to select the desired character to be printed.

3. A telegraph printer as defined in claim 2, in which the characters are disposed in linear relation on the type body, and in which the type body is moved in the direction of the line of characters by the aforesaid cable when acted on by the aforesaid pulleys.

4. A telegraph printer as defined in claim 2, in which the characters are disposed around the periphery of a circular type body, and in which the type body is rotated by the aforesaid cable when acted on by the aforesaid pulleys.

5. A telegraph printer as defined in claim 2, in which the type body is cylindrical with lines of characters about the surface thereof, and in which there are both first and second sets of the said plurality of pulleys, and in which the type body is moved axially by a first cable when acted on by said first set of pulleys, and in which the type body is rotated by a second cable when acted on by said second set of pulleys, and in which a single motor driven cam shaft operates all of the pulleys.

6. A telegraph printer as defined in claim 5, in which the type cylinder is eight characters long in axial direction and the first cable is acted on by a first set of pulleys having three movable pulleys to select any desired one of the eight positions in axial direction, and in which the circumference is divided into eight characters, and in which the second cable is acted on by a second set of pulleys having three pulleys to select any desired one of the eight positions in rotative direction, whereby sixty-four type spaces are made available.

7. A telegraph printer as defined in claim 5, in which the cylinder is carried by and is slidable along a rigid shaft which is immovable axially but is rotatable, and in which the type body is rotatable with the shaft, said first cable extending in the direction of the shaft and being operatively connected to the type body for moving it axially, and in which the second cable is wound about said shaft for rotating it.

8. A telegraph printer as defined in claim 5, in which the cylinder is carried by and is slidable along a rigid longitudinally slotted tube which is immovable axially but rotatable, and in which the type body is rotatable with the tube, said first cable passing axially through the tube and being connected to the type body through the slot for moving it axially, and in which the second cable is wound about a drum carried by said tube, and in which the hammer strikes the back of the paper toward the selected character on the type body with the ink ribbon therebetween.

9. A telegraph printer as defined in claim 2, in which the paper being printed passes over a platen which is immovable axially, and in which the type body is fed step by step across the paper by a pawl and ratchet mechanism independently of the character selecting movement of the type body, and in which the hammer is fed step by step across the paper in synchronism with the feed movement of the type body, and in which the motor supplies the energy for the feed movements.

10. A printer as defined in claim 2, in which the type body is fed step by step across the paper by a pawl and ratchet mechanism, and in which the cable is divided into two parts, one of which is used for character selection and the other of which is used for step-by-step feed, and in which the said two cables are coupled by means of an additional pulley, the first cable being operatively connected to said additional pulley in addition to being trained around the selector pulleys, the second cable being trained around said additional pulley, and being connected at one end to the type body, and being connected at the other end to the pawl and ratchet mechanism which takes up the cable step-by-step.

11. In a telegraph printer, a type body having a plurality of characters to be printed, a cable connected to the type body for moving the same to select the character to be printed, a plurality of pulleys about which the cable is trained in series, means to move each of said pulleys to either of two positions in a direction to effectively shorten or lengthen the cable, the effective cable change produced by one of said means and pulleys being double that produced by another, electrical circuits to control said pulley moving means, a motor driven sequence shaft operating in approximate synchronism with signal pulses from a transmitter, said shaft having means to permit movement of single pulleys in a desired sequence when the signal pulses call for movement, an intermittent drive element between said motor and said shaft, a detent to prevent operation of said shaft, and a magnet controlling said detent, whereby a first or synchronizing signal initiates operation of the sequence shaft in proper time relation to distribute succeeding signals to the successive pulley moving means, whereupon the sequence shaft is arrested until again released by a starting signal as aforesaid.

12. In a telegraph printer, a type body having a plurality of characters to be printed, a cable connected to the type body for moving the same to select the character to be printed, a plurality of pulleys about which the cable is trained in series, a motor driving a cam shaft having a series of intermittently driven cams spaced axially therealong, there being a cam for each pulley, a pair of detents for each cam for holding said cams in either of two positions, cam follower levers positioned by said cams and carrying the aforesaid pulleys to move the same between either of two positions in a direction to effectively shorten or lengthen the cable, the effective cable change produced by one of said cams and pulleys being double that produced by another, magnets associated with said detents, electrical circuits to energize said magnets in appropriate combinations to select the desired character to be printed, a motor driven sequence shaft operating in approximate synchronism with signal pulses from a transmitter, said shaft having means to permit movement of single pulleys in a desired sequence when the signal pulses call for movement, an intermittent drive element between said motor and said shaft, a detent to prevent operation of said shaft, and a magnet controlling said detent, whereby a first or synchronizing signal initiates operation of the sequence shaft in proper time relation to make succeeding signals effective for the different cams, whereupon the sequence shaft is arrested until again released by a starting signal as aforesaid.

13. A telegraph printer as defined in claim 12, in which the type body is cylindrical with lines of characters about the surface thereof, and in which there are both first and second sets of the said plurality of pulleys, and in which the type body is moved axially by a first cable when acted on by said first set of pulleys, and in which the type body is rotated by a second cable when acted on by said second set of pulleys, and in which a single motor driven cam shaft operates all of the pulleys.

14. A telegraph printer as defined in claim 13, in which the type cylinder is eight characters long in axial direction and the first cable is acted on by a first set of pulleys having three movable pulleys to select any desired one of the eight positions in axial direction, and in which the circumference is divided into eight characters, and in which the second cable is acted on by a second set of pulleys having three pulleys to select any desired one of the eight positions in rotative direction, whereby sixty-four type spaces are made available.

15. A telegraph printer as defined in claim 13, in which the cylinder is carried by and is slidable along a rigid shaft which is immovable axially but rotatable, and in which the type body is rotatable with the shaft, said first cable extending in the direction of the shaft and being operatively connected to the type body for moving it axially, and in which the second cable is wound about said shaft for rotating it.

16. A telegraph printer as defined in claim 13, in which the cylinder is carried by and is slidable along a rigid longitudinally slotted tube which is immovable axially but rotatable, and in which the type body is rotatable with the tube, said first cable passing axially through the tube and being connected to the type body through the slot for moving it axially, and in which the second cable is wound about a drum carried by said tube, and in which the hammer strikes the back of the paper toward the selected character on the type body with the ink ribbon therebetween.

17. A telegraph printer as defined in claim 12, in which the paper being printed passes over a platen which is immovable axially, and in which the type body is fed step by step across the paper by a pawl and ratchet mechanism independently of the character selecting movement of the type body, and in which the hammer is fed step by step across the paper in synchronism with the feed movement of the type body.

18. A telegraph printer as defined in claim 12, in which the type body is fed step by step across the paper by a pawl and ratchet mechanism, and in which the cable is divided into two parts, one of which is used for character selection and the other of which is used for step-by-step feed, and in which the said two cables are coupled by means of an additional pulley, the first cable being operatively connected to said additional pulley in addition to being trained around the selector pulleys, the second cable being trained around said additional pulley, and being connected at one end to the type body, and being connected at the other end to the pawl and ratchet mechanism which takes up the cable step-by-step.

19. In a telegraph printer, a cylindrical type body having lines of characters about the surface thereof, a first cable connected to the type body for moving the same axially, a first set of pulleys about which the cable is trained in series, a second cable for rotating the type body, a second set of pulleys about which the second cable is trained in series, means to move each of said pulleys to either of two positions in a direction to effectively shorten or lengthen the cable, the effective cable change produced by one of said means and pulleys in each set being double that produced by another in said set, electrical circuits to control said means in appropriate combinations to select the desired character to be printed, a first light-weight strip movable with said first cable and having a plurality of register positions, a second light-weight strip positioned collaterally of the first strip and movable with said second cable and having a plurality of register positions, a pusher repeatedly moved in a direction transversely of said strips, and means responsive to movement of the pusher for initiating a special function, said means being actuated only when a pusher and a register position of each strip are in alignment and correspond to a blank position on said printing cylinder for initiating a special function such as paper feed, carriage return, or a shift between letters and figures.

20. In a telegraph printer, a cylindrical type body having lines of characters about the surface thereof, a first cable connected to the type body for moving the same axially, a first set of pulleys about which the cable is trained in series, a second cable for rotating the type body, a second set of pulleys about which the second cable is trained in series, a cam shaft having a series of intermittently driven cams spaced axially therealong, there being a cam for each pulley, a pair of detents for each cam for holding said cams in either of two positions, cam follower levers positioned by said cams and carrying the aforesaid pulleys to move the same between either of two positions in a direction to effectively shorten or lengthen the cable, the effective cable change produced by one of said cams and pulleys being double that produced by another, magnets associated with said detents, electrical circuits to energize said magnets in appropriate combinations to select the desired character to be printed, a first light-weight strip movable with said first cable and having a plurality of register positions, a second light-weight strip positioned collaterally of the first strip and movable with said second cable and having a plurality of register positions, a pusher repeatedly moved by the aforesaid motor in a direction transversely of said strips, and means responsive to movement of the pusher for initiating a special function, said means being actuated only when a pusher and a register position of each strip are in alignment and correspond to a blank position on said printing cylinder for initiating a special function such as paper feed, carriage return, or a shift between letters and figures.

21. In a telegraph printer, a type body having a plurality of characters to be printed, a cable connected to the type body for moving the same to select the character to be printed, a plurality of pulleys about which the cable is trained in series, a series of cams, a motor for intermittently driving any of said series of cams to either of two positions, there being a cam for each pulley, magnetic means associated with each cam to make the motor operative for that purpose, cam follower levers positioned by said cams and carrying the aforesaid pulleys to move the same between either of two positions in a direction to effectively shorten or lengthen the cable, the effective cable change produced by one of said cams and pulleys being double that produced by another, electrical circuits to energize said magnetic means in appropriate combinations to select the desired character to be printed, a sequence shaft operating in approximate synchronism with signal pulses from a transmitter, said shaft having means to permit movement of single pulleys in a desired sequence when the signal pulses call for movement, an intermittent drive element between the aforesaid motor and said shaft, a detent to prevent operation of said sequence shaft, and a magnet controlling said detent, whereby a first or synchronizing signal initiates operation of the sequence shaft in proper time relation to make succeeding signals effective for the different cams, whereupon the sequence shaft is arrested until again released by a starting signal as aforesaid.

22. A telegraph printer as defined in claim 21, in which the characters are disposed in linear relation on the type body, and in which the type body is moved in the direction of the line of characters by the aforesaid cable when acted on by the aforesaid pulleys.

23. A telegraph printer as defined in claim 21, in which the characters are disposed around the periphery of a circular type body, and in which the type body is rotated by the aforesaid cable when acted on by the aforesaid pulleys.

24. In a telegraph printer, a type body having a plurality of characters to be printed, a cable connected to the type body for moving the same to select the character to be printed, a plurality of pulleys about which the cable is trained in series, means to move each of said pulleys to either of two positions in a direction to effectively shorten or lengthen the cable, the effective cable change produced by one of said means and pulleys being double that produced by another, electrical circuits to control said means in appropriate combinations to select the desired character to be printed, a light-weight register strip movable with said cable and having a plurality of register positions, a pusher repeatedly moved in a direction transversely of said strip, and means responsive to movement of the pusher for initiating a special function, said means being actuated only when the pusher and a register position of said strip are in alignment and correspond to a blank position on said type body for initiating a special function such as paper feed, carriage return, or a shift between letters and figures.

25. In a telegraph printer, a cylindrical type body having lines of characters about the surface thereof, a first cable connected to the type body for moving the same axially, a second cable for rotating the type body, means to effectively shorten or lengthen the cables, electrical circuits to control said means in appropriate combinations to select the desired character to be printed, a first lightweight register strip movable with said first cable and having a plurality of register positions, a second lightweight strip positioned collaterally of the first strip and movable with said second cable and having a plurality of register positions, a pusher repeatedly moved in a direction transversely of said strips, and means responsive to movement of the pusher for initiating a special function, said means being actuated only when a pusher and a register position of each strip are in alignment and correspond to a blank position on said printing cylinder for initiating a special function such as paper, feed, carriage return, or a shift between letters and figures.

26. In a telegraph printer, a cylindrical type body having lines of characters about the surface thereof, a first cable connected to the type body for moving the same axially, a first set of pulleys about which the cable is trained in series, a second cable for rotating the type body, a second set of pulleys about which the second cable is trained in series, a cam shaft, a motor for driving said cam shaft, a series of intermittently driven cams spaced axially therealong, there being a cam for each pulley, a pair of detents for each cam for holding said cams in either of two positions, cam follower levers positioned by the camming surfaces of said cams and carrying the aforesaid pulleys to move the same between either of two positions in a direction to effectively shorten or lengthen the cable, the effective cable change produced by one of said cams and pulleys being double that produced by another, magnets associated with said detents, electrical circuits to energize said magnets in appropriate combinations to select the desired character to be printed, a first register means connected to and moved by the first cable, a second register means connected to and moved by the second cable, and means operating when said first register means combines with the second register means at a blank position on said printing cylinder for initiating a special function such as paper feed, carriage return, or a shift between letters and figures.

References Cited in the file of this patent

UNITED STATES PATENTS 2,161,840     Adams _________________ June 13, 1939